(12) United States Patent
Tanaka et al.

(10) Patent No.: US 6,586,137 B1
(45) Date of Patent: Jul. 1, 2003

(54) BATTERY SEPARATOR

(75) Inventors: Masanao Tanaka, Sowa-machi (JP);
Hiroaki Yamazaki, Sowa-machi (JP);
Yoshihiko Kondo, Sowa-machi (JP);
Keisuke Takahashi, Sowa-machi (JP);
Toshiaki Takase, Sowa-machi (JP);
Shinji Oota, Gifu (JP)

(73) Assignees: Japan Vilene Company, Ltd., Tokyo (JP); UBE-Nitto Kasei Co., Ltd., Tokyo (JP)

(*) Notice: Subject to any disclaimer, the term of this patent is extended or adjusted under 35 U.S.C. 154(b) by 208 days.

(21) Appl. No.: 09/658,012

(22) Filed: Sep. 8, 2000

(30) Foreign Application Priority Data

Sep. 14, 1999 (JP) .............................. 11-259735
Aug. 8, 2000 (JP) ....................... 2000-239965

(51) Int. Cl.⁷ .............................. H01M 2/16; H01M 2/18
(52) U.S. Cl. ..................... 429/249; 429/142; 429/144; 429/247; 429/253
(58) Field of Search ................................ 429/247, 249, 429/144, 142, 253

(56) References Cited

U.S. PATENT DOCUMENTS 4,216,281 A * 8/1980 O'Rell et al. ................ 429/252
4,264,691 A    4/1981 O'Rell et al.
5,453,333 A * 9/1995 Takauchi et al. ............... 429/62
6,030,727 A    2/2000 Tanaka et al.
6,037,079 A    3/2000 Tanaka et al.
6,183,913 B1   2/2001 Tanaka et al.
6,203,902 B1 * 3/2001 Ota et al. ..................... 428/364

FOREIGN PATENT DOCUMENTS

EP    0-987-356 A1    3/2000

* cited by examiner

Primary Examiner—Patrick Ryan
Assistant Examiner—Julian Mercado
(74) Attorney, Agent, or Firm—Oliff & Berridge, PLC

(57) ABSTRACT

A battery separator is provided which is hardly broken by tension during the manufacture of batteries, is hardly punctured with a plate flash, and is hardly torn off with a plate edge, thereby hardly causing a short circuit. Accordingly, the separator can facilitate the stable manufacture of the batteries. The battery separator is equipped with a fiber sheet containing a polypropylene fiber having a tensile strength of not less than 10 g/d (denier) and a Young's modulus of not less than 800 kg/mm$^2$, said separator having a resistance of not less than 585 gf to puncture by edge, or is equipped with a fiber sheet containing not less than 10 mass % of a polypropylene fiber having a tensile strength of not less than 10 g/d (denier) and a Young's modulus of not less than 800 kg/mm$^2$.

26 Claims, 3 Drawing Sheets

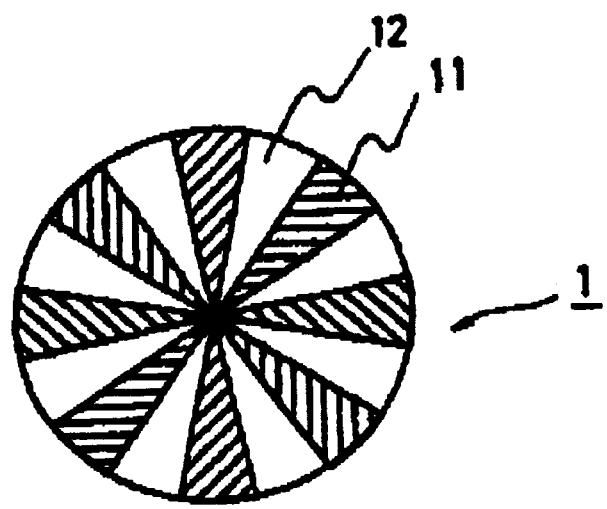
F I G. 1
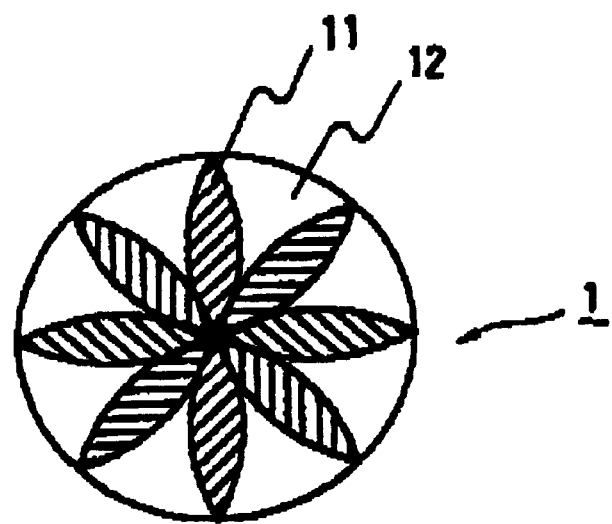
F I G. 2

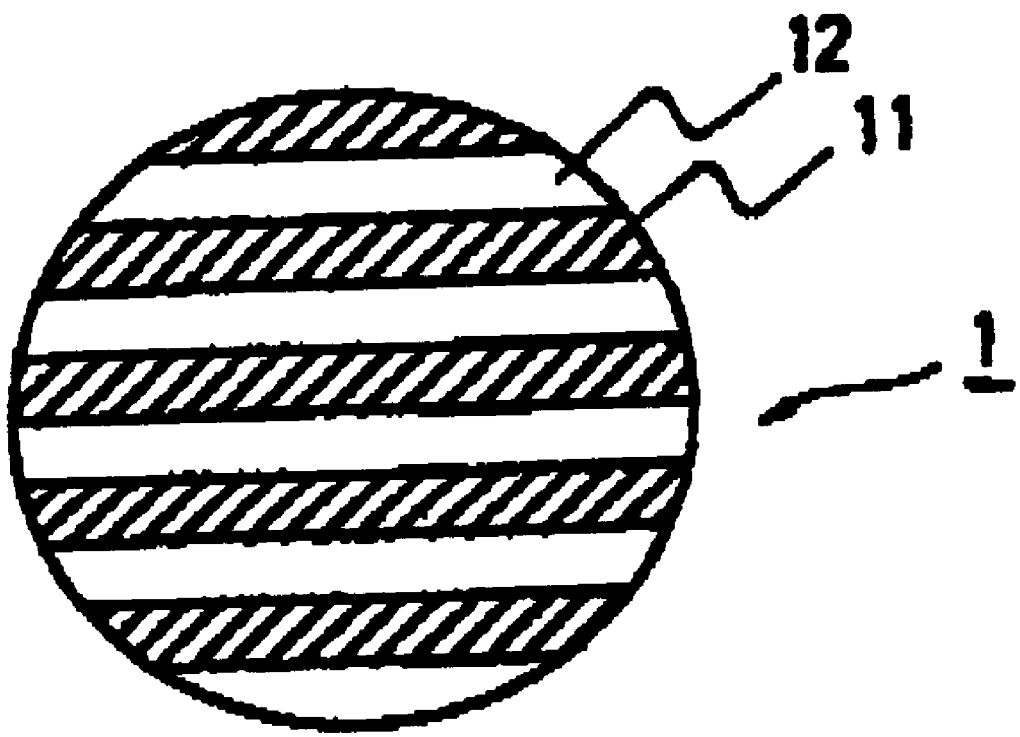
F I G. 5

BATTERY SEPARATOR

TECHNICAL FIELD OF THE INVENTION

The present invention relates to a battery separator. More particularly, the present invention relates to a battery separator which is capable of preventing a short circuit in batteries to reduce the poor quality rate of the batteries.

BACKGROUND OF THE ART

A separator has been used between an anode and a cathode in alkaline batteries to separate them for preventing short-circuiting and also to hold an electrolyte for carrying out a smooth electromotive reaction.

Recently, a space allotted for the battery has been becoming smaller in electronic instruments due to the need for miniaturization and weight-saving. Nevertheless, the performance and property requirement for such a battery is the same as or even more higher than that for a conventional battery, and therefore, there has been a demand to increase the capacity of the batteries. For such a purpose, it is necessary to increase the amount of active materials in electrodes whereby a volume occupied by the separator therein is to inevitably be reduced. In other words, a thickness of the separator is to be made thinner. However, if the conventional separator is simply made thin, there are problems that the separator may be liable to be broken by tension during a step of assembling plates for the production of batteries (composed of plate groups), a plate flash or flashes may go through the separator or the separator may be liable to be torn off by a plate edge or edges, said problems causing a short circuit whereby the yield of batteries will become poor.

In order to solve such problems, for example, JP, 10-284042, A (1996) discloses a separator using a fiber with a high strength in which the strength of a single fiber is 5 g/d (denier) or more. Although such a prior art separator is capable of improving situations as aforementioned, there has been still a demand for a separator where the above-mentioned problems are far less caused.

The present invention has been carried out for solving the above problems. An object of the present invention is to provide a battery separator which will hardly be broken by tension during the manufacturing stage of batteries (composed of plate groups), will hardly be punctured with a plate flash or will hardly be torn off by a plate edge so that a short circuit will hardly take place whereby batteries will now be able to be manufactured in a stable manner.

SUMMARY OF THE INVENTION

A battery separator (also hereinafter briefly referred to as "separator") according to the present invention is equipped with a fiber sheet containing polypropylene fibers with a tensile strength of not less than 10 g/d (denier) and a Young's modulus of not less than 600 kg/mm$^2$ (hereinafter, referred to as "high Young's modulus polypropylene fibers"), said separator having a resistance to penetration by edge with a force of not less than 585 gf (i.e., its puncture strength: not less than 585 gf). The inventors have found that the separator equipped with a fiber sheet containing the high Young's modulus polypropylene fibers, said separator having its puncture strength of not less than 585 gf, hardly causes accidents including the breakage of the separator by tension applied during the manufacturing stage of batteries (composed of plural plates), the perforation of the separator with a plate flash or flashes, and the tearing of the separator by a plate edge or edges, leading to the occurrence of a short circuit, whereby the batteries can now be manufactured in a stable manner.

Another separator of the present invention is equipped with a fiber sheet containing not less than 10 mass % of polypropylene fibers (high Young's modulus polypropylene fibers) with a tensile strength of not less than 10 g/d (denier) and a Young's modulus of not less than 800 kg/mm$^2$. The inventors have found that, since the said high Young's modulus polypropylene fiber has excellent strength and elasticity, the separator equipped with a fiber sheet containing not less than 10 mass % of the said high Young's modulus polypropylene fiber hardly causes problems that the separator may be broken by tension during the manufacturing stage of batteries (composed of plural plates), the plate flash may go through the separator and the separator may be torn off by the plate edge, said problems leading to a short circuit, whereby batteries can now be manufactured in a stable manner.

In the case of fiber sheets each containing not less than 20 mass % of fusible fibers, separator's tensile strength and bending resistance are improved whereby problems hardly occur that the separator may be broken by tension during the manufacturing stage of the batteries (composed of plate groups), the plate flash goes through the separator and the separator is torn off by the plate edge, said problems resulting in a short circuit.

Especially when the tensile strength of the fusible fiber is not less than 3 g/d (denier), events more hardly occur that the separator may be broken by tension during the manufacturing stage of the batteries (composed of plate groups), the plate flash goes through the separator and the separator is torn off by the plate edge, said events resulting in a short circuit.

In addition, when the high Young's modulus polypropylene fiber is thicker than the fusible fiber, the said high Young's modulus polypropylene fibers form a skeleton in a state of being bonded via fusing with the fusible fibers. Therefore, even if a deformation happens, it can be retained within a deformation of the fused fiber. Accordingly, the thickness of the separator in the batteries can be maintained, spaces can be secured and the good permeability of gas is achievable whereby the inner pressure of the battery can be reduced when it is used as a separator for closed type batteries. Further, since the thickness of the separator can be maintained, the electrolyte is hardly squeezed out and the deficiency of electrolyte can be suppressed whereby there is another effect that the life of the batteries can be extended.

Further, when the low-melting component in the fusible fiber in high-density polyethylene, a strong fusion is achieved and an excellent tensile strength is obtained as well. Therefore, events more hardly occur that the separator may be broken by tension during the manufacturing stage of the batteries (composed of plate groups), the plate flash goes through the separator, and the separator is torn off by the plate edge, said events leading to a short circuit.

Furthermore, in the case of the fiber sheet containing not less than 10 mass %, and more preferably not loss than 20 mass %, of superfine polyolefin fibers, a property of retaining the electrolyte can be improved and a deficiency of the electrolyte can be suppressed whereby there is an effect that the life of the batteries can be extended.

The above-mentioned polypropylene fiber (high Young's modulus polypropylene fiber) is preferably a species having a thermal shrinkage ratio of 8% or less at the temperature of 140° C. When the thermal shrinkage ratio is 8% or less, the resulting separator has an excellent uniform fiber dispersibility due to reduced changes in the size of the separator even when heat is applied during the manufacture of the separator. Therefore, the separator has quite better characteristics in terms of the aforementioned properties.

It is preferable that the cross sectional fibrous shape of the above-mentioned polypropylene fiber (high Young's modulus polypropylene fiber) is non-circular. When the cross sectional fibrous shape is not circular, the above-mentioned properties become better. This is believed to be explained by the presumption that, even when the plate f lash or edge touches the high Young's modulus polypropylene fiber, the high Young's modulus polypropylene fiber hardly slips and a dislocation at a contacting point of the fiber is suppressed whereby a force from the flash and the edge may be received in a dispersed manner. In addition, when the high Young's modulus polypropylene fiber is non-circular in cross section, the fiber sheet can be in a densified structure, thereby facilitating the preparation of a thinner separator.

It is also preferable that the above-mentioned polypropylene fiber (high Young's modulus polypropylene fiber) is fibrillatable. If fibrillatable, it is far better in view of the above-mentioned properties, this is believed to be explained by the presumption that, even when the plate flash or edge touches this high Young's modulus polypropylene fiber, the said high Young's modulus polypropylene fiber is fibrillated and can catch the force from the flash or the edge whereby the penetrating force by the edge and flash hardly acts.

When the battery separator possesses the resistance to puncture by needle with a force of 700 gf or more, the plate flash more hardly penetrates the separator showing an excellent resistance to short circuiting.

When a texture index of the battery separator is 0.2 or less, the fiber (particularly, high Young's modulus polypropylene fiber) is in a uniformly dispersed state, whereby events hardly take place that the separator is puncture with the plate flash and is broken by the plate edge, said events causing a short circuit.

When the thickness retention ratio of the battery separator is 86% or more, it is possible to retain the thickness of the separator in the battery. A void can also be secured therein and the good permeability of gas can be achieved. Therefore, when it is used as a separator for closed-type batteries, the inner pressure of the battery can be reduced. In addition, since the thickness of the separator can be retained, the electrolyte is hardly squeezed out and the deficiency of the electrolyte can be suppressed whereby there is another effect that the life of the batteries can be extended.

BRIEF DESCRIPTION OF THE DRAWINGS

FIG. 1 is a schematic cross section of the splittable fiber according to the present invention.

FIG. 2 is a schematic cross section of another splittable fiber according to the present invention.

FIG. 5 is a schematic cross section of another splittable fiber according to the present invention.

Figure 3:
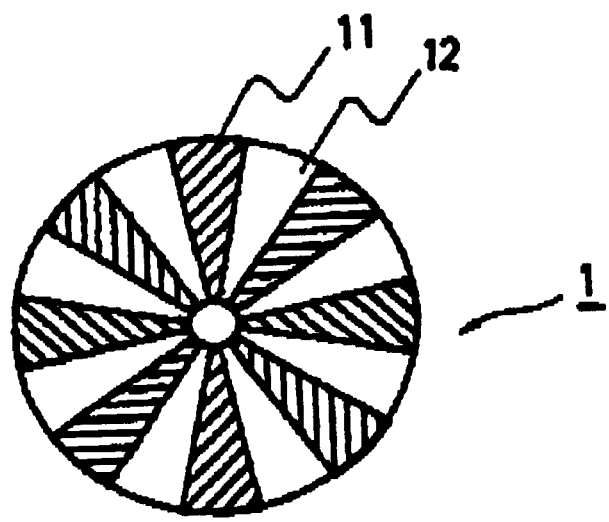
FIG. 3 is a schematic cross section of another splittable fiber according to the present invention.
Figure 4:
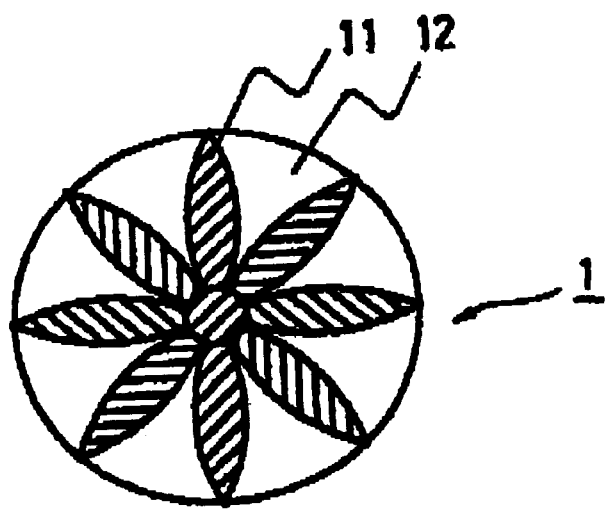
FIG. 4 is a schematic cross section of another splittable fiber according to the present invention.

1: splittable fiber
11: a component
12: another component

DETAILED DESCRIPTION OF THE INVENTION

Described below are detailed modes for carrying out the invention.

The separator of the present invention contains a high Young's modulus polypropylene fiber so that the separator will not be broken by tension during the manufacture of the batteries (composed of plate groups), the plate flash will not go through the separator, and the separator will not be torn off by the plate edge. Therefore, it will never or hardly cause a short circuit. Since the high Young's modulus polypropylene fiber has an excellent resistance to chemicals and is free from being affected by an electrolyte as well, it can provide a stable property for a long period.

It is necessary that this high Young's modulus polypropylene fiber has a tensile strength of 10 g/d (denier) or more and a Young's modulus of 800 $kg/mm^2$ or more when the fiber has such properties, the separator will not be broken by tension during the manufacture of the batteries (composed of plate groups), the plate flash will not go through the separator, and the separator will not be torn off by the plate edge, thereby never or hardly causing a short circuit. The former tensile strength is more preferably 11 g/d or more but there is no particular restriction for the upper limit. The latter Young's modulus is more preferably 850 $kg/mm^2$ or more but there is no particular restriction for the upper limit.

The term "tensile strength" as used herein refers to a value as measured according to JIS L 1015 (Testing Methods for Man-made Staple Fibers; a constant rate of strain type). The term "Young's modulus" refers to an apparent Young's modulus value as calculated from an initial tensile resistance measured according to JIS L 1015.

When the thermal shrinkage ratio of this high Young's modulus polypropylene fiber at the temperature of 140° C. (hereinafter, the thermal shrinkage ratio is the value measured at the temperature of 140° C.) is 8% or less, the resulting separator exhibits an excellent uniform fiber dispersibility due to less changes in the size of the separator even under an application of heat during the manufacture of the separator, thereby providing better characteristics as mentioned above. In more specific embodiments, fusible fibers are contained in addition to the high Young's modulus polypropylene fiber, said fusible fibers improving a tensile strength and bending resistance thereof, whereby the high Young's modulus polypropylene fiber is hardly shrunk even when the fusible fiber is thermally fused. As a result, changes in the size of the separator hardly take place. Accordingly, a property of uniformly dispersing the fibers is hardly deteriorated whereby the above-mentioned properties are far better. A more preferred thermal shrinkage ratio is 7% or less. This thermal shrinkage ratio is a value of the dry thermal shrinkage ratio measured using an oven drier (140° C.) according to JXS L 1015.

In addition, when the cross sectional fibrous shape of the above-mentioned polypropylene fiber (high Young's modulus polypropylene fiber) is non-circular, it is advantageous because the plate flash hardly goes through the separator and the separator is hardly torn off by the plate edge. This is believed to be explained by the presumption that, even when the plate flash or edge touches the high Young's modulus polypropylene fiber, the high Young's modulus polypropylene fiber hardly slips and a dislocation at the contacting point of the fiber is suppressed whereby a force from the flash or edge can be received in a dispersed manner. In addition, because the high Young's modulus polypropylene fiber is non-circular in cross section, the fiber sheet can be in a densified structure, thereby facilitating the preparation of thinner separators. Specific examples of the cross sectional shape are long oval, polygons (such as triangle, square, pentagon and hexagon), alphabetical letter-shape (such as X-shaped, Y-shaped, I-shaped and V-shaped), etc. Among them, polygonal shapes such as pentagonal and hexagonal ones are preferred.

It is also preferable that the high Young's modulus polypropylene fiber is fibrillatable because the plate flash hardly goes through the separator and the plate edge hardly tears off the separator. This is believed to be explained by the presumption that, when the plate flash or edge touches this high Young's modulus polypropylene fiber, the said high Young's modulus polypropylene fiber is fibrillated and can catch force from the flash or edge whereby the penetrating force by the edge and flash hardly works. The high Young's modulus polypropylene fiber may be partially or entirely fibrillated in advance or may not be fibrillated. When the said fiber is partially or entirely fibrillated in advance, it is advantageous because, even when the plate flash or edge touches the high Young's modulus polypropylene fiber, the high Young's modulus polypropylene fiber hardly slips wherein the dislocation at the contacting point of the fiber is suppressed, but can be more finely fibrillated, whereby the short circuit due to the flash or edge actions will be prevented. There is another effect that part or all of the high Young's modulus polypropylene fibers are fibrillated, thereby improving a property of retaining the electrolyte more. The term "fibrillatable" means that it is possible to produce, by force from outside, fibrils wherein one end is in a free state while another end is connected to the high Young's modulus polypropylene fiber. Such a fibrillated state can be easily confirmed by means of an electron microscopic photo.

The fineness of the said high Young's modulus polypropylene fiber is preferably around 0.1 to 2 denier so that the property of retaining the electrolyte is good. It in more preferably around 0.1 to 1.5 denier. The fiber length of the high Young's modulus polypropylene fiber may vary depending upon the state of the fiber sheet, but it is preferably 1 to 160 mm when the fiber sheet consists of a preferred nonwoven fabric.

Such a high Young's modulus polypropylene fiber is contained at a rate of 10 mass % or more so that the plate flash does not go through the separator and the plate edge does not break the separator. The more its amount, the less the short circuit. The content in preferably 20 mass % or more.

Such a high Young's modulus polypropylene fiber can be prepared as follows: For instance, fibers are used as starting materials which can be prepared by a melt spinning of isotactic polypropylene where an isotactic pentad factor (IPF) is 95 to 100% and the ratio of weight average molecular weight to number average molecular weight (Q value) is less than 4. Such starting fibers are subjected to a drawing at the drawing vessel temperature of 120° C. or higher and the drawing ratio of 7 times or more using a drawing apparatus in which a pressure water tank is placed at an inlet part for substances to be drawn and at an outlet part for drawn substances, respectively, and a drawing vessel filled with high temperature compressed steam is used. Thereafter, conventional processes such as adding treatment of fiber oil, crimping treatment, drying, cutting, etc. are optionally carried out to give products with various fibrous shapes including chopped fiber and staple fiber. The fiber as prepared according to such a method is crystallized in a manner highly oriented to a direction of its fibrous axis.

When the side of the fiber is observed in a state of a cross nicol under polarized light as disclosed in Japanese Patent Application No. 10-154242 (1998), there is a specific zebra pattern consisting of intermittent dark and bright areas having different refractive indexes in the direction of its fibrous axis.

The separator of the present invention is equipped with a fiber sheet containing (1) the high Young's modulus polypropylene fibers as mentioned already, and preferably, in addition to the high Young's modulus polypropylene fibers, (2) superfine polyolefin fibers with a fineness of 0.5 denier or less (preferably from 0.01 denier to 0.3 denier) in view of achieving not only an excellent property of retaining the electrolyte but also an excellent resistance to the electrolyte. The said superfine polyolefin fiber is preferably composed of one or more resin components selected from the group consisting of polyethylenes (e.g., high-density polyethylenes, medium-density polyethylenes, low-density polyethylenes, linear low-density polyethylenes, etc.), ethylene copolymers (e.g., ethylene-propylene copolymers, ethylene-butene-propylene copolymers, ethylene-acrylic acid copolymers, ethylene-methacrylic acid copolymers, ethylene-vinyl alcohol copolymers, etc.), polypropylenes, propylene copolymers, polymethylpentenes, methylpentene copolymers, etc. Among them, a member selected from polyethylenes and/or polypropylenes is particularly preferred.

Such a superfine polyolefin fiber can be prepared by 8 melt-blow method, by dividing a splittable fiber which can be divided by a physical action, or by dividing a splittable fiber which can be divided by a chemical action. The physical action includes, for example, those by liquid flow (or liquid jet) such as water flow (or water jet), needle, calendar, flat press and the like. The chemical treatment includes, for example, dissolving and removal of the resin component(s) with a solvent, swelling of the resin component(s) with a solvent, etc. The splittable fiber as used herein includes those which are composed of two or more resin components and have either a orange-shaped cross section of the fiber as illustrated in any of FIGS. 1 to 4 or a multiple bimetal type cross section thereof as illustrated in FIG. 5. The splittable fiber is composed of two or more kinds of resin components wherein, with an object that superfine polyolefin fiber can be generated, at least one kind thereof consists of a polyolefin resin component. It is preferable that the said fiber consists of a polyolefin resin component alone so that only a superfine fiber consisting of a polyolefin resin component can be generated.

The fiber length of this splittable fiber (i.e., superfine polyolefin fiber) also varies depending upon the state of the fiber sheet. When the fiber sheet consists of favorable nonwoven fabric, it is preferred that the fiber length is 1 to 160 mm In the case of formation of a superfine polyolefin fiber by a melt blow method, there is no particular limitation.

Such a superfine polyolefin fiber is preferably contained in the fiber sheet at a rate of 10 mass % or more, and more preferably 20 mass % or more, so that the property of retaining the electrolyte is excellent.

The separator of the present invention preferably contains a fusible fiber so that its tensile strength and bending resistance are excellent. This fusible fiber is preferably a species containing a resin component with a lower melting point (hereinafter also referred to as "low-melting component") than the melting point of the high Young's modulus polypropylene resin component at least on the surface of the fiber so that the strength of the high Young's modulus polypropylene resin component is not lowered. It is preferable that the melting point of the constituent low-melting component for the fusible fiber is lower than the melting point of the high Young's modulus polypropylene resin component to an extent of 5° C. or more, and more preferably 10° C. or more. When the superfine polyolefin fiber is also contained therein, it is preferable that the melting point of the low-melting component of the fusible fiber is lower than the melting point of the constituent resin component for the superfine polyolefin fiber. In more specific embodiments, it is preferably lower to an extent of 5° C. or more, and more preferably 10° C. or more.

The "melting point" as used herein is a temperature corresponding to a maximum value on a melting endothermic curve obtained using a differential scanning calorimeter via raising the temperature at the rate of 10° C./minute from room temperature.

In view of attaining an excellent resistance to electrolytes, it is preferable that this fusible fiber also consists of one or more resin components selected from the same resin components as mentioned for the above superfine polyolefin fiber. Since it is preferred that the constituent resin component for the splittable fiber contains polyethylene and polypropylene, it is preferable to use high-density polyethylene as the polyethylene for constituting the splittable fiber while low-density polyethylene is used as the low-melting component of the fusible fiber. The fusible fiber may be either composed of a single component or composed of not less than two resin components. The latter (composed of two or more resin components) is advantageous because the tensile strength of the separator can be more improved. When the fusible fiber consists of two or more resin components, the cross sectional shape of the fusible fiber may, for example, be of a sheath-core type, an eccentric type, a side-by-side type, a sea-island type, a multiple bimetal type or an orange type.

The fiber length of this fusible fiber also varies depending upon the state of the fiber sheet. When the fiber sheet is composed of an appropriate nonwoven fabric, its fiber length is preferably 1 to 160 m. Further, the fineness of the fusible fiber is preferably 0.6 to 5 denier, more preferably 0.6 to 1.5 denier, and still more preferably 0.6 to 1 denier, so that the property of retaining the electrolyte is excellent.

It is preferable that the tensile strength of the fusible fiber is 3 g/d or more because separator's resistances to puncture by edge and by needle can be further improved whereby events more hardly happens that the separator will be broken by tension during the manufacturing step of batteries (composed of plate groups), the plate flash will go through the separator and the separator will be torn off by the plate edge, said events causing short circuiting. A more preferred tensile strength is 4 g/d or more. Such a fusible fiber may include those composed of high-density polyethylene as its low-melting component. In more specific embodiments, the fusible fiber includes those constituted of high-density polyethylene alone, sheath-core type fibers wherein the core component consists of polypropylene while the sheath component (low-melting component) consists of high-density polyethylene, and the like. When the low-melting component of the fusible fiber is high-density polyethylene as such, not only a strong fusion is achievable but also its tensile strength is excellent. Therefore, it is preferred because events more hardly happens that the separator is broken by tension during the manufacturing step of batteries (composed of plate groups), the plate flash goes through the separator and the separator is torn off by the plate edge, said events leading to short circuiting.

It is also preferable that the fusible fiber is finer than the high Young's modulus polypropylene fiber, or in other words the high Young's modulus polypropylene fiber is thicker than the fusible fiber. In that case, the high Young's modulus polypropylene fibers form skeletons which will be fused with and bonded to the fusible fibers, thereby leading to a bonded state. Therefore, even when pressure is applied, the deformation is restricted to an extent less than the thickness of the fusible fiber. Accordingly, the thickness of the separator can be maintained in the battery, a void can be secured therein and the good permeability of gas is achievable whereby the inner pressure of the batteries will be reduced to a quite low level when the separator is used for closed type batteries. Further, since the thickness of the separator can be maintained, the electrolyte is hardly squeezed out and the deficiency of the electrolyte can be suppressed whereby there is another effect that the life of the batteries can be extended. Although there is no particular limitation for the difference between the size of the fusible fiber and that of the high Young's modulus polypropylene fiber, it is preferably 3 $\mu$m or more in terms of the fiber diameter.

The term "fiber diameter" refers to a diameter when the cross sectional shape of the fiber is circular while it refers to an estimated diameter as obtained after conversion to a virtual circular cross section when it is non-circular.

In view of improving its tensile strength and bending resistance, it is preferable that such a fusible fiber is contained at a rate of 20 mass % or more.

When the constituent fibers for the separator according to the present invention are composed of the above-mentioned high Young's modulus polypropylene fibers and fusible fibers, it is preferable that their ratio bymass is (high Young's modulus polypropylene fiber):(fusible fiber)=10 to 80:90 to 20, more preferably (high Young's modulus polypropylene fiber):(fusible fiber)=10 to 50:90 to 50, and still more preferably (high Young's modulus polypropylene fiber):(fusible fiber)=20 to 50:80 to 50. When the constituent fibers for the separator are composed of the above-mentioned high Young's modulus polypropylene fibers, fusible fibers and superfine polyolefin fibers, it is preferable that their ratio by mass in (high Young's modulus polypropylene fiber):(fusible fiber):(superfine fiber)=10 to 70:20 to 70:10 to 70, more preferably (high Young's modulus polypropylene fiber):(fusible fiber) a (superfine fiber) 10 to 60:20 to 70:20 to 70, still further more preferably (high Young's modulus polypropylene fiber) : (fusible fiber):(superfine fiber) a 30 to 45:30 to 50:20 to 35, and most preferably (high Young's modulus polypropylene fiber):(fusible fiber):(superfine fiber)=30 to 40:35 to 45:20 to 30.

As mentioned hereinabove, the separator of the present invention contains the high Young's modulus polypropylene fibers, preferably contains the fusible fibers, and more preferably it further contains the superfine polyolefin fibers. In some cases, in addition to those fibers, it may further contain one or more members selected from the group consisting of, for example, fibers where the tensile strength is less than 10 g/d and/or the Young's modulus is less than 800 kg/mm$^2$, undivided splittable fibers, etc.

The separator of the present invention is equipped with a fiber sheet containing the high Young's modulus polypropylene fiber as mentioned above. Embodiments of this fiber sheet may include, for example, nonwoven fabrics, textiles, knittings, and composite products thereof. Among them, it is preferable that it contains a nonwoven fabric having an excellent property of retaining the electrolyte in view of its structure. The separator of the present invention may be constituted of the fiber sheet alone or may be conjugated with a micro-porous film, net, etc., in addition to the fiber sheet. When the micro-porous film and the fiber sheet are conjugated, it is possible to make the separator thinner.

The separator of the present invention has the above-mentioned constitutions, said separator possessing its resistance of 585 gf or more to puncture by edge. When the resistance to puncture by edge is less than 585 gf, there are tendencies that the separator may be broken by tension during the manufacturing stage of the batteries (composed of plate groups), the plate flash or flashes go through the separator and the separator is torn off by the plate edge or edges, said events leading to a short circuit. Thus, the said resistance is more preferably 600 gf or more.

The resistance to puncture by edge (puncture strength against edge) is a value obtained as follows:

Separators are piled to make the total thickness about 2 mm. A stainless steel jig (thickness 0.5 mm; edge angle at its tip end: 60°) set on a Randy Compression Tester (KES-G5; manufacture by Kato Tech Co. Ltd.) is vertically put through the uppermost separator at the rate of 0.01 cm/second and the force required for penetrating the said uppermost separator is measured and defined as its resistance to puncture by edge.

Preferred separators according to the present invention are those in which their resistance to puncture by needle is 700 gf or more, when the resistance to puncture by needle is less than 700 gf, the constituent fibers for the separator are liable to be localized and penetrated by the plate flash, etc., thereby leading to short circuiting. Thus, the said resistance is preferably 750 gf or more.

The resistance to puncture by needle (puncture strength against needle) is a value obtained as follows:

One separator is placed on a support stand having a cylindrical through hole (inner diameter: 11 mm) in such a manner as to cover the said cylindrical through hole. A fixing material having a cylindrical through hole (inner diameter: 11 mm) is further placed on the separator in such a manner as to fit its center with the center of the cylindrical through hole of the above support stand, thereby fixing the separator. Thereafter, a needle (curvature radius at its tip end=0.5 mm; diameter=1 mm; projection length from the jig=2 cm) set on a Handy Compression Tester (KES-G5; manufacture by Kato Tech Co, Ltd.) is vertically pushed through the separator at the rate of 0.01 cam/second and the force required for puncturing the separator is measured and defined as its resistance to puncture by needle.

When the texture index of the separator according to the present invention is 0.2 or less, the fibers (particularly, the high Young's modulus polypropylene fiber) are in a homogeneously dispersed state. Therefore, events hardly happen that plate flash goes through the separator and the separator is cut by the plate edge. For these reasons, it is preferred. A more preferred texture index for the instant separator is 0.15 or less.

This term "texture index" refer to a value as obtained by a method mentioned in Japanese Patent Application No. 11-152139 (1999). Thus, it is a value obtained as follows:

(1) Light is irradiated from a light source to a specimen to be measured (separator) and, among the irradiated light, the reflected light from the predetermined region of the specimen to be measured is detected by a light-receiving element to obtain an luminance information.

(2) The predetermined region of the specimen to be measured is equally divided into images each having the size of 3 mm square, 6 mm square, 12 mm square or 24 m square to prepare one pattern. As a result, division patterns of four kinds (i.e., image sizes: 9 $mm^2$, 36 $mm^2$, 144 $mm^2$, and 576 $mm^2$) are totally obtained.

(3) A luminance value for each section obtainable by equal division per division pattern thus obtained is calculated based upon the luminance information.

(4) An average luminance (X) for each division pattern is calculated based upon the luminance value for each section.

(5) A standard deviation ($\sigma$) for each division pattern is determined.

(6) A coefficient of variation (CV) for each division pattern is calculated by the following formula:

Coefficient of variation $(CV)=(\sigma/X)\times 100$ wherein $\sigma$ is a standard deviation for each division pattern and X is an average luminance for each division pattern.

(7) A coordinate group was obtained by assigning (1) the logarithm of each image size to the coordinate X and (2) the coefficient of variation corresponding to the said image size to the coordinate Y. The resultant coordinate group is subjected to regression to a primary straight line by means of a least-squares method, whereby its inclination is calculated. The absolute value of the said inclination is defined as a texture index.

In addition, when the thickness retention ratio of the battery separator is 86% or more, it is possible to maintain a thickness of the separator in the battery, to secure spaces therein and to achieve a good permeability of gas therein. Therefore, when the said separator is used for closed type batteries, the inner pressure of the batteries will be reduced to a quite low level. Further, since the thickness of the separator can be maintained, the electrolyte is hardly squeezed out and the deficiency of the electrolyte can be suppressed whereby there is another effect that the life of the batteries can be extended. A more preferred thickness retention ratio is 90% or more.

The thickness retention ratio is a value obtained as follows:

The initial thickness of a separator in applying the load of 200 g thereon (normal thickness) is measured by a micrometer (spindle diameter: 6.35 mm). Then the next thickness of the separator in applying the loaded of 1,000 g is measured by the micrometer. The percentage of the next thickness at the load of 1,000 g to the initial at the load of 200 g is defined as a thickness retention ratio.

The separators of the present invention can be manufactured by conventional methods using the above-mentioned high Young's modulus polypropylene fibers. In the case of nonwoven fabrics, they can be manufactured, for example, according to the following processes A fiber web containing 10 mass % or more of the above-mentioned high Young's modulus polypropylene fibers (preferably in combination with 20 mass % or more of fusible fibers, and more preferably further together with 10 mass % or more of splittable fibers) is first prepared by wet-or dry-laid methods including a card method, an air-lay method, etc. The resulting fiber web alone or after layered is subjected to an entangling treatment and/or a fusion treatment (in case where the fusible fiber is contained) whereby a product is manufactured. The nonwoven fabric prepared by means of both entanglement and fusion is particularly advantageous because of its excellent tensile strength, tear strength, rigidity and resistance to short circuiting. When the fiber web is manufactured by the wet-laid method, it is advantageous because the separator can be prepared which has a uniform texture. Further, when the fiber web prepared by the dry-laid method is layered in combination with the fiber web prepared by the wet-laid method, it is advantageous because the separator can be prepared which has not only a strength but also a minuteness.

It is preferable to use the fusible fiber wherein its tensile strength is 3 g/d or more, to use the fusible fiber in which the low-melting component consists of high-density polyethylene or to select and carry out a combination thereof in such a manner that the high Young's modulus polypropylene is thicker than the fusible fiber.

When the entangling treatment and the fusion treatment are jointly applied, they may be carried in any order. Further, they may be repeated for any time. For example, each entangling treatment and fusion treatment may be carried out once in this order or in a reversed order. Alternatively, the order may be fusion treatment, entangling treatment and then fusion treatment where two fusion treatments and one entangling treatment are carried out.

The entangling treatment applicable in the present invention includes, for example, treatments by a liquid flow, especially by a water flow. This entangling treatment by a liquid flow is advantageous since the whole of fiber web can be homogeneously entangled. The entangling condition by the liquid flow includes, for example, those where a liquid flow having a pressure of 1 MPa to 30 MPa is jetted out from a nozzle plate with one or more rows of nozzles each having a nozzle diameter of 0.05 to 0.3 mm and a nozzle pitch is 0.2 to 3 mm. Such a liquid flow is jetted once or more to one or both sides of the fiber web.

The fusion treatment as used herein may be carried out with or without pressure. Alternatively, the low-melting component of the fusible fiber is melted without pressure and then compressed. It is preferable that the compression is carried out simultaneously or after melting the low-melting component of the fusible fiber in order to adjust the thickness. It is particularly preferable that the low-melting component of the fusible fiber is melted without pressure, and then compressed immediately because the separator in which its resistance to puncture by edge is 585 gf or more and its resistance to puncture by needle is 700 gf can be readily manufactured thereby. The heating temperature therefor is preferably within such a range of from the softening point of the low-melting component in the fusible fiber to the melting point thereof when heating and compression are carried out simultaneously, or preferably within such a range of from the softening point of the low-melting component in the fusible fiber to the temperature 20° C. higher than the melting point thereof when the compression is carried out after heating. In any case, the compression is preferably 1 to 30 N/cm in terms of a linear pressure. The linear pressure of 5 to 30 N/cm is more preferred.

The term "softening temperature" as used herein refers to a temperature giving a starting point of the fusion endothermic curve obtained using a differential scanning calorimeter by raising the temperature at the rate of 10° C./minute from room temperature.

When the splittable fiber is used, a dividing treatment is necessary. However, when it is treated by the above-mentioned entangling treatment by a liquid flow, it can be divided simultaneously. Therefore, it is advantageous in terms of steps. When the dividing treatment is carried out separately from the liquid flow dividing treatment, such a dividing treatment may be carried out, for example, by needles, calendar or a flat press.

The separator of the present invention where the resistance to puncture by edge is 585 gf or more can be prepared by adjusting various conditions including use of a high Young's modulus polypropylene fiber having a high tensile strength, quantitative increase of the high Young's modulus polypropylene fibers, homogeneous dispersion of the high Young's modulus polypropylene fiber, conduction of a tight adhesion with the fusible fibers, use of a fusible fiber having a high tensile strength, melting of the low-melting component in the fusible fiber and then compression thereof immediately, and the like.

The separator of the present invention where the resistance to puncture by needle in 700 gf or more can be prepared by adjusting various conditions including use of a high Young's modulus polypropylene fiber having a high Young's modulus, quantitative increase of the high Young's modulus polypropylene fibers, homogeneous dispersion of the high Young's modulus polypropylene fibers, conduction of a tight adhesion with the fusible fibers, melting of the fusible fiber and thereafter immediate fusion thereof via compression, etc.

The separator of the present invention where the texture index in 0.2 or less can be prepared by adjusting various conditions including formation of fiber webs by the wet-laid method, use and homogeneous dispersion of fibers which are not adhered by pressure each other, use of fibers having a fiber diameter of around 0.1 to 30 μm, use of fibers having a fiber length of about 1 to 20 mm, etc.

The separator of the present invention where the thickness retention ratio is 86% or more can be prepared by adjusting various conditions including use of fusible fibers having a high tensile strength, use of high Young's modulus polypropylene fibers having a high Young's modulus, thermal fusion of high Young's modulus polypropylene fibers with fine fusible fibers, tight fusion of the high Young's modulus polypropylene fibers with fusible fibers, melting of fusible fibers and then immediate adhesion thereof via compression, etc.

It is preferable that the separator of the present invention is subjected to hydrophilization so as to give better property of retaining the electrolyte. The hydrophilization includes, for example, sulfonation, treatment with fluorine gas, graft polymerization with a vinyl monomer, treatment with a surface-active agent, electric discharge treatment and treatment of giving a hydrophilic resin. This hydrophilization may be carried out for the fiber sheet or may be carried out before preparation of the fibersheet. AS hereunder, the treatment for the fiber sheet will be illustrated although it may be also carried out prior to the formation of the fiber sheet in a similar manner.

The sulfonation includes, for example, methods for dipping the above-mentioned fiber sheet in a solution containing a member selected from the group consisting of fuming sulfuric acid, sulfuric acid, chlorosulfuric acid and sulfuryl chloride to introduce a sulfonic acid group thereinto; methods for contacting the above-mentioned fiber sheet with sulfur trioxide gas to introduce a sulfonic acid group thereinto; methods for carrying out an electric discharge in the presence of sulfur monoxide gas or sulfur dioxide gas to introduce a sulfonic acid; and the like.

The treatment with fluorine gas includes, for example, methods for contacting the fiber sheet with a gas mixture consisting of (i) fluorine gas diluted with inert gas (such as nitrogen gas and argon gas) and (ii) at least one gas member selected from the group consisting of oxygen gas, carbon dioxide gas and sulfur dioxide gas whereby the fiber sheet is hydrophilized, etc.

The vinyl monomer graft polymerization includes, for example, methods for dipping the fiber sheet in a solution containing a vinyl monomer and a polymerization initiator followed by heating: methods for applying a vinyl monomer to the fiber sheet followed by irradiating with a radioactive ray: methods for irradiating the fiber sheet with a radioactive ray followed by contacting with a vinyl monomer; methods for applying a vinyl monomer solution containing a sensitizer to the fiber sheet followed by irradiating with UV; etc. The vinyl monomer applicable herein includes, for example, acrylic acid, methacrylic acid, acrylates, methacrylates, vinylpyridine, vinylpyrrolidone, and styrene. When styrene is subjected to graft polymerization, it in preferable that it is sulfonated so an to afford a good affinity with the electrolyte. When the fiber sheet is modified by any of ultraviolet irradiation, corona discharge, plasma discharge, and the like prior to contact of the vinyl monomer solution with the fiber sheet, it is improved in terms of its affinity with the vinyl monomer solution whereby a efficient graft polymerization can be carried out.

The surface-active agent treatment includes, for example, methods for dipping the fiber sheet in a solution containing a member selected from the group consisting of an anionic surface-active agent (such as an alkaline metal salt of higher fatty acids, alkyl sulfonate and sulfosuccinate), a nonionic surface-active agent (such as polyoxyethylene alkyl ether or polyoxyethylene alkyl phenol ether) and the like, and methods for painting or spraying the said surface-active agent solution on the fiber sheet to adhere the surface-active agent thereon.

The electric discharge treatment includes, for example, corona discharge treatments, plasma treatments, glow discharge treatments, electronic ray treatments, etc. When a method is used for placing the fiber sheet between a pair of electrodes each carrying dielectrics in an atmospheric pressure of air so as to contact it with both dielectrics and applying an alternative current voltage between those electrodes to generate electric discharge in inner voids of the fiber sheet, it is possible to carry out a hydrophilization of the fiber surface in the inner area of the fiber sheet whereby the separator having excellent inner pressure characteristics can be manufactured.

The hydrophilic resin giving treatment includes, for example, those capable of adhering a hydrophilic resin such as carboxymethyl cellulose, polyvinyl alcohol, cross-linkable polyvinyl alcohol or polyacrylic acid. Such a hydrophilic resin can be adhered via dissolving or dispersing it in an appropriate solvent followed by dipping the fiber sheet in the resultant solution, applying or spraying the said solution thereto prior to drying.

The cross-linkable polyvinyl alcohol includes, for example, a polyvinyl alcohol wherein part of the hydroxyl groups are substituted with a photo-sensitive group. More specific examples thereof are polyvinyl alcohols where part of the hydroxyl groups are substituted with a photo-sensitive group selected form the group consisting of a styrylpyridinium type group, a stryrlquinolinium type group and a styrylbenzothiazolium type group. Similar to other hydrophilic resins, the said cross-linkable polyvinyl alcohol may be cross-linked by adhering it on the fiber sheet followed by irradiating with light. Such a polyvinyl alcohol wherein part of the hydroxyl groups are substituted with a photo-sensitive group can be advantageously used since it not only has an excellent resistance to alkali, but also contains a lot of hydroxyl groups capable of forming chelates with ions so as to form the chelate with the ion before precipitation of branch-like metal on plates during discharge and/or charge whereby it is possible to prevent short circuiting between the electrodes.

The mass per unit area of the separator according to the present invention is preferably 20 to 100 $g/m^2$, more preferably 30 to 100 $g/m^2$, and still more preferably 40 to 80 $g/m^2$. This is because its tensile strength may be insufficient when the mass per unit area is less than 20 $g/m^2$ while its thickness becomes too thick when it is more than 100 $g/m^2$.

The separators of the present invention are hardly broken by tension during the manufacturing stage of the batteries (composed of plate groups), hardly punctured with the plate flash, and hardly torn off by the plate edge. Therefore, batteries using the separator of the present invention never or hardly cause a short circuit. Accordingly, it is now possible to manufacture the batteries in stable manner.

Thus, the separator of the present invention can be advantageously used as a battery separator for (1) primary cells/batteries including alkali-manganese batteries, mercury batteries, silver oxide batteries, air batteries, etc. and (2) secondary cell/batteries including nickel-cadmium batteries, silver-zinc batteries, silver-cadmium batteries, nickel-zinc batteries, nickel-hydrogen batteries, etc.

ADVANTAGES OF THE INVENTION

The battery separator of the present invention equipped with a fiber sheet containing a polypropylene fiber having a tensile strength of not less than 10 g/d (denier) and a Young's modulus of not less than 800 $kg/mm^2$, said separator having a resistance to puncture by edge of not less than 585 gf, is hardly broken by tension during the manufacturing stage of the batteries (composed of plate groups), is hardly punctured with the plate flash, and is hardly torn off with the plate edge, thereby hardly causing a short circuit. Accordingly, the separator of the present invention has made a success of manufacturing batteries in a stable manner.

The separator of the present invention equipped with a fiber sheet containing not less than 10 mass % of a polypropylene fiber having a tensile strength of not less than 10 g/d (denier) and a Young's modulus of not less than 800 $kg/mm^2$ is hardly broken by tension during the manufacturing stage of the batteries (composed of plate groups), is hardly punctured with the plate flash, and is hardly torn off with the plate edge, thereby hardly causing a short circuit. Accordingly, the separator of the present invention has made a success of manufacturing batteries in a stable manner.

In the case of fiber sheets each containing not less than 20 mass % of fusible fibers, separator's tensile strength and bending resistance are improved whereby the separator is hardly broken by tension during the manufacturing stage of the batteries (composed of plate groups), is hardly punctured with the plate flash, and is hardly torn off with the plate edge, thereby hardly causing a short circuit.

Especially when the tensile strength of the fusible fiber is not lees than 3 g/d (denier), the separator is hardly broken by tension during the manufacturing stage of the batteries (composed of plate groups), is hardly punctured with the plate flash, and is hardly torn off with the plate edge, thereby hardly causing a short circuit.

In addition, when the high Young's modulus polypropylene fiber is thicker than the fusible fiber, the said high Young's modulus polypropylene fiber forms a skeleton and the said skeleton is in a state of being fused and bonded with the fusible fiber. Therefore, even if it is deformed, it can be retained within a deformation of the fusible fiber. Accordingly, the thickness of the separator can be maintained, an void can be secured and the permeability of gas is excellent in the batteries whereby the inner pressure of the battery will be reduced when it is used as a separator for closed type batteries. Further, since the thickness of the separator can be maintained, the electrolyte is hardly squeezed out and the deficiency of the electrolyte can be suppressed whereby there is another effect that the life of the batteries can be extended.

Further, when the low-melting component in the fusible resin is high-density polyethylene, it is tightly fused and has a good tensile strength. Therefore, the separator may hardly be broken by tension during the manufacturing stage of the batteries (composed of plate groups), may hardly be punctured with the plate flash, and may hardly be torn off with the plate edge, thereby hardly causing a short circuit.

In the case of the fiber sheet containing not less than 10 mass %, and more preferably not less than 20 mass % of the superfine polyolefin fiber, its property of retaining the electrolyte can be improved and its electrolyte deficiency can be suppressed whereby there is an effect that the life of the battery can be extended.

The thermal shrinkage ratio of the above-mentioned polypropylene fiber (high Young's modulus polypropylene fiber) at the temperature of 140° C. is preferably 8% or less. When the thermal shrinkage ratio is 8% or less, the resulting separator has an excellent uniform fiber dispersion due to little changes in its size even when heat is applied during the manufacture of the separator. Therefore, the separator has better characteristics as mentioned above.

It is preferable that the above-mentioned polypropylene fiber (high Young's modulus polypropylene fiber) is non-circular in cross section. When the cross sectional fibrous shape is not circular, it has more excellent properties as aforementioned. This is believed to be explained by the presumption that, even when the plate flash or edge touches the high Young's modulus polypropylene fiber, the high Young's modulus polypropylene fiber hardly slips, and distortion and slippage at the contacting point of the fibers is suppressed whereby the force from the flash and edge can be received in a dispersed manner. In addition, the fiber sheet can be in a densified structure because the cross section of the high Young's modulus polypropylene fiber is non-circular. Therefore, it in possible to prepare a thinner separator.

It is also preferable that the above-mentioned polypropylene fiber (high Young's modulus polypropylene fiber) is fibrillatable. If fibrillatable, it has more excellent properties as aforementioned. This is believed to be explained by the presumption that the said high Young's modulus polypropylene fiber is fibrillated when the plate flash or edge touches this high Young's modulus polypropylene fiber with the result that the high Young's modulus polypropylene fiber can catch force from the flash or edge whereby the penetrating force by the edge and flash hardly act*.

When battery separator's resistance to puncture by needle is 700 gf or more, the plate flash more hardly punctures the separator whereby an excellent resistance to short circuit is achieved.

When the texture index of the battery separator is 0.2 or less, the fiber (particularly, high Young's modulus polypropylene fiber) is in a uniformly dispersed state. Therefore, the separator is hardly punctured with the plate flash and is hardly broken by the plate edge with the result that a short circuit will never or hardly occur.

When the thickness retention ratio of the battery separator is 86% or more, it is possible to retain the thickness of the separator in the battery and a void can be secured and the permeability of gas is excellent. Therefore, when it in used as a separator for closed type batteries, the inner pressure of the battery will be reduced. In addition, since the thickness of the separator can be retained, the electrolyte is hardly squeezed out and the deficiency of the electrolyte can be suppressed whereby there is another effect that the life of the batteries can be extended.

DESCRIPTION OF THE PREFERRED EMBODIMENTS

Described below are examples of the present invention (related to battery separators) which are provided only for illustrative purposes, and not to limit the scope of the present invention.

EXAMPLE 1

Isotactic polypropylene (IPF=97%, Q value=3.6, and melt index (NI)=22) was used as a starting material. The starting material was subjected to a melt spinning using a melt spinning apparatus equipped with a fine spinning nozzle at the spinning temperature of 280° C. and the spinning rate of 450 m/minute to give a spun fiber with a single fiber denier of 10 denier.

The said spun fiber was drawn at the drawing ratio of 8.5 times using a drawing apparatus wherein pressurized water with an absolute pressure of 4.4 kg/cm$^2$ was placed at the inlet for targets to be drawn and at the outlet for the drawn target, and a drawing vessel charged with pressurized saturated steam (temperatures 145° C.) having an absolute pressure of 4.2 kg/cm$^2$, a roller for sending the target to be drawn into the drawing vessel at a constant speed and another roller for pulling the drawn target out of the drawing vessel at a constant speed were arranged. Following the drawing the resultant product was treated with oil and cut in a predetermined length to manufacture a high Young's modulus polypropylene fiber (melting points 174° C.) where its fineness was 1.2 denier (fiber diameter=13.7 μm), its fiber length was 10 mm, its tensile strength was 12 g/d, its Young's modulus was 850 kg/mm$^2$ and its thermal shrinkage ratio was 7%. It is noted that this high Young's modulus polypropylene fiber is nearly pentagonal in cross section and fibrillatable.

On the other hand, for the fusible fiber a sheath-core type fusible fiber was prepared where the core component consisted of polypropylene while the sheath component (low-melting component) consisted of high-density polyethylene (melting point: 135° C.) and its fineness was 1.1 denier (fiber diameter=13.1 μm), its fiber length was 5 mm and its tensile strength was 3.5 g/d. Next, a slurry prepared by mixing and dispersing 30 mass % of the above high Young's modulus polypropylene fiber and 70 mass % of the above sheath-core type fusible fiber was subjected to a conventional wet-laid web-forming method to give a fiber web, Then, this fiber web was heated for 10 seconds in an oven set at 135° C. whereby only a sheath component in the sheath-core type fusible fiber was melted. Thereafter, the web was passed through calendar rolls with a linear pressure of 9.8 N/cm to manufacture a fused nonwoven fabric.

The resulting fused nonwoven fabric was then hydrophilized by contacting for 120 seconds with a mixed gas consisting of fluorine gas (3 vol. %), oxygen gas (5 Vol. %), sulfur dioxide gas (5 vol. %) and nitrogen gas (87 vol. %) to manufacture a separator (mass per unit area=60 g/m$^2$; and thickness=0.15 mm).

EXAMPLE 2

The operation of Example 1 was repeated except that a fiber web was formed by a conventional wet-laid web-forming method from a slurry prepared by mixing and dispersing (i) 40 mass % of high Young's modulus polypropylene fibers (melting point: 174° C.; fineness=1.2 denier (fiber diameter=13.7 μm); fiber length=10 mm; tensile strength=12 g/d; Young's modulus=850 kg/mm$^2$ and thermal shrinkage ratio=7%) manufactured in the same manner as in Example 1 and (ii) 60 mass % of sheath-core type fusible fibers (fineness 1.1 denier (fiber diameter=13.1 μm); fiber length=5 mm; and tensile strength=3.5 g/d) wherein the core component was polypropylene while the sheath component (low-melting component) was high-density polyethylene (melting point: 135° C.) similarly to Example 1. As a result, a separator (mass per unit area=60 g/m$^2$; and thickness=0.15 mm) was manufactured.

EXAMPLE 3

The operation of Example 1 was repeated except that a hydrophilization was carried out by dipping a fused nonwoven fabric for 10 minutes into a 39° C. fuming sulfuric acid solution (15% SO$_3$ solution) to manufacture a separator (mass per unit area=60 g/m$^2$; and thickness=0.15 mm).

EXAMPLE 4

A fiber web was manufactured by a conventional wet-laid web-forming method from a slurry prepared by mixing and dispersing (i) 30 mass % of high Young's modulus polypropylene fibers (melting point: 174° C.; fineness=1.2 denier (fiber diameter=13.7 μm); fiber length=10 mm; tensile strength=12 g/d; Young's modulus=850 kg/mm$^2$; and thermal shrinkage ratio=7%) manufactured in the same manner as in Example 1 and (ii) 70 mass % of sheath-core type fusible fibers (fineness=0.7 denier (fiber diameter=10.4 μm); fiber length=5 mm; and tensile strength=3.5 g/d) where the core component was polypropylene while the sheath component low-melting component) was high-density polyethylene (melting point: 135° C.).

Then this fiber web was heated for 10 seconds by an oven set to the temperature of 135° C., and immediately thereafter pressurized (2.5 N/cm) by a water-cooled cooling roll to manufacture a fused nonwoven fabric wherein the fibers were fused with the sheath component of the sheath-core fusible fiber.

Next, the fumed nonwoven fabric was dipped for 10 minutes into a 39° C. fuming sulfuric acid solution (15% SO$_3$ solution) to carry out a hydrophilization whereupon a separator (mass per unit area=62 g/m$^2$; and thickness=0.15 mm) was manufactured.

EXAMPLE 5

Formation of a fiber web, formation of a fused nonwoven fabric and hydrophilization were carried out in the entirely same manner as in Example 4 to manufacture a separator (mass per unit area=55 g/m$^2$; and thickness=0.12 mm).

EXAMPLE 6

An operation was carried out in the entirely same manner as in Example 4 except that 20 mass % of high Young's modulus polypropylene fibers and 80 mass % of sheath-core type fusible fibers were used to obtain a fiber web. The resulting fiber web was subjected to a fusing treatment to manufacture a fused nonwoven fabric.

In the meanwhile, a liquid for graft polymerization was prepared which consists of the following admixture components (1) to (6):

| | | |
|---|---|---|
| (1) acrylic acid monomer | 30 mass % |
| (2) benzophenone | 0.1 mass % |
| (3) iron sulfate | 0.4 mass % |
| (4) nonionic surface-active agent | 0.1 mass % |
| (5) polyethylene glycol (degree of polymerization = 400) | 10 mass % |
| (6) Water | 59.4 mass % |

Then the above fused nonwoven fabric was dipped in the above liquid for graft polymerization (wherein the liquid for graft polymerization was contained at a ratio of 0.8 to the mass per unit area of the fused nonwoven fabric) and UV irradiated (365 nm is dominant) at the luminance of 180 mW/cm$^2$ for 20 seconds in air with metal halide mercury lamps which were each placed at both sides of the fused nonwoven fabric, thereby leading to first graft polymerization.

Next, the resultant first graft polymerized fused nonwoven fabric product was covered in a sandwiched manner with two non air-permeable polypropylene film sheets so as not to exclude air in not only the inner spaces but also the spaces near the outer surface thereof and then UV irradiated (365 nm is dominant) at the luminance of 180 mW/cm$^2$ for 10 seconds from metal halide mercury lamps which were each placed at both sides of the first graft polymerized fused nonwoven fabric, thereby leading to second graft polymerization.

Then the fused nonwoven fabric to which the second graft polymerization was applied was well washed with water, dried and then subjected to a calendar treatment at the linear pressure of 10 N/cm to manufacture a separator (grafted degree=9.6%; mass per unit area=55 g/m$^2$; and thickness=0.12 mm) wherein acrylic acid was graft-polymerized.

EXAMPLE 7

For the splittable fiber, a fiber hating an orange-shaped cross section (fineness=1.3 deniers fiber diameter=14.2 μm; fiber length=15 mm) was prepared which had the cross sectional structure with such a shape as depicted in FIG. 3 and contained (i) a polypropylene component (12 in FIG. 3) capable of generating superfine fibers (fineness=0.08 denier; fiber diameter=3.5 μm; melting points 160° C.), (ii) a high-density polyethylene component (11 in FIG. 3) capable of generating superfine fibers (fineness=0.08 deniers fiber diameter=3.5 μm; melting points 132° C.), and further (iii) a circular polypropylene component capable of generating superfine fibers (fineness=0.02 denier; fiber diameter=1.8 μm; melting point: 160° C.) wherein the components (i) and (ii) diverged from the center of the cross section one another to form 8 divisions apart and the component (iii) was positioned at its central part.

On the other hand, (i) a sheath-core type fusible fiber (fineness=1.1 denier (finer diameter=13.1 μm), fiber length= 10 mm; tensile strength=2 g/d) consisting of polypropylene as a core component and low-density polyethylene (melting point: 115° C.) as a sheath component (low melting component) for the fusible fiber and (ii) a high Young's modulus polypropylene fiber (melting point: 174° C.; fineness=1.2 denier (fiber diameter=13.7 μm); fiber length= 10 mm tensile strength=12 g/d; Young's modulus=850 kg/mm$^2$; and thermal shrinkage ratio=7%) manufactured in the same manner as in Example 1 were prepared.

Next, a slurry prepared by mixing and dispersing 50 mass % of the above splittable fibers, 20 mass % of the above sheath-core type fusible fibers and 30 mass % of the above high Young's modulus polypropylene fibers was treated according to a wet-laid web-forming method to form a fiber web (mass per unit area=40 g/m$^2$, "wet-method fiber web").

A fiber web (mass per unit area=20 g/m$^2$, "dry-method fiber web") was formed by carding (i) 40 mass % of splittable fibers identical with the aforementioned splittable fiber except that the fiber length was 25 mm, (ii) 35 mass % of high Young's modulus polypropylene fibers identical with the aforementioned high Young's modulus polypropylene fiber except that the fiber length was 38 mm, and (iii) 25 mass % of sheath-core type fusible fibers identical with the aforementioned sheath-core type fusible fiber except that the fineness was 1.5 denier (fiber diameter=15.3 μm) and the fiber length was 51 mm.

Next a layered product prepared by laying one fiber web over another for the wet-method and dry-method fiber webs was thermally treated (preliminarily fused) at the temperature of 120° C. for 10 seconds, then placed on a plain weave net (texture opening=0.175 mm), and treated via jetting a water flow (pressure=12 MPa) from a nozzle plate (nozzle pitch=0.6 mm; and nozzle diameter=0.13 mm) on the layered product twice each to both sides thereof alternately whereupon the splittable fiber was divided and the fibers were simultaneously entangled to form a divided entangled nonwoven fabric.

Then the divided entangled nonwoven fabric was thermally treated for 10 seconds in a hot air circulating type drier set to the temperature of 120° C., and then immediately compressed by water cooled cooling rolls (2.5 N/cm) to give a fused nonwoven fabric wherein the sheath-core type fusible fibers were fused via their sheath components.

Next, the fused nonwoven fabric was dipped for 10 minutes into a 39° C. fuming sulfuric acid solution (15% SO$_3$ solution) to carry out a hydrophilization whereupon a separator (mass per unit area=60 g/m$^2$; and thickness=0.15 mm) was manufactured.

Comparative Example 1

A polypropylene fiber (PNHC; manufactured by Daiwabo Co., Ltd.; fineness=1.2 denier (fiber diameter=13.7 μm); fiber length=10 mm; tensile strength=9 g/d; Young's modulus=400 kg/mm$^2$; and thermal shrinkage ratio=10%) was made ready. These polypropylene fibers had a circular cross sectional shape. They were not fibrillatable. The same operation as in Example 1 was repeated except that a fiber web was prepared by a conventional wet-laid web-forming method from a slurry prepared by mixing and dispersing 30 mass % of the said polypropylene fibers and 70 mass % of the same sheath-core type fusible fibers as in Example 1 whereupon a separator (mass per unit area=60 g/m$^2$; and thickness=0.15 mm) was prepared.

Comparative Example 2

A fiber web was prepared by a conventional wet-laid web-forming method from a slurry obtained by dispersing 100 mass % of sheath-core type fusible fibers (fineness=1.1 denier (fiber diameter=13.1 μm); and fiber length=5 mm) wherein the core component consisted of polypropylene while the sheath component consisted of high-density polyethylene (melting points 135° C.). Then this fiber web was heated for 10 seconds in an oven set to the temperature of 135° C., and then immediately compressed (2.5 N/cm) with water cooled cooling rolls to manufacture a fused nonwoven fabric wherein the sheath-core type fusible fibers were fused via their sheath components.

Next, the fused nonwoven fabric was dipped for 10 minutes in a 39° C. fusing sulfuric acid solution (15% SO$_3$ solution) to carry out hydrophilization whereupon a separator (mass per unit area=62 g/m$^2$; and thickness=0.15 mm) was manufactured.

Comparative Example 3

A fiber web was produced in the entirely same manner as in Comparative Example 2 and then it was heated for 10 seconds in an oven sot to the temperature of 135° C. (without compressing with water cooled cooling rolls) to manufacture a fused nonwoven fabric wherein the sheath-core type fusible fibers were fused via their sheath components.

Next, the fused nonwoven fabric was dipped for 10 minutes into a 39° C. fuming sulfuric acid solution (15% SO$_3$ solution) to carry out hydrophilization whereupon a separator (mass per unit area=62 g/m$^2$; and thickness=0.15 mm) was manufactured.

Comparative Example 4

A fiber web was produced by carding 100 mass % of sheath-core type fusible fibers (fineness=1.1 denier (fiber diameter=13.1 μm); and fiber length=38 mm) where the core component consisted of polypropylene while the sheath component consisted of high-density polyethylene (melting point: 135° C.).

Then this fiber web was heated for 10 seconds in an oven met to the temperature of 135° C. (without compressing with water cooled cooling rolls) to manufacture a fused nonwoven fabric wherein the sheath-core type fusible fibers were fused via their sheath components.

Next, the fused nonwoven fabric was dipped for 10 minutes into a 39° C. fuming sulfuric acid solution (15% SO$_3$ solution) to carry out hydrophilization whereupon a separator (mass per unit area=62 g/m$^2$; and thickness=0.15 mm) was manufactured.

TABLE 1

|  | Bees per Unit Area (g/hr) | Thickness (mm) | Resist. Punct. by Edge (gf) *1 | Resist. Punct. by Needle (gf) *2 | Texture Index | Thick. Rat Rate (%) *3 | Tensile Strength (N/6 cm width) | Ductility (%) | Short Circuit Rats (%) | Cell Life (%) | Inner Press. of Cell (%) *4 |
|---|---|---|---|---|---|---|---|---|---|---|---|
| Cp. Ex. 1 | 80 | 0.15 | 509 (100) | 860 | 0.15 | 85 | 170 | 23 | 0.09 | 100 | 100 |
| Cp. Ex. 2 | 82 | 0.15 | 480 (94) | 900 | 0.12 | 82 | 170 | 22 | 0.12 | 95 | 110 |
| Ex. 1 | 80 | 0.15 | 610 (120) | 1010 | 0.11 | 83 | 170 | 23 | 0.04 | 106 | 90 |
| Ex. 2 | 80 | 0.15 | 662 (130) | 800 | 0.12 | 94 | 150 | 26 | 0.03 | 106 | 87 |
| Ex. 3 | 80 | 0.15 | 585 (115) | 900 | 0.12 | 82 | 160 | 25 | 0.04 | 107 | 93 |
| Ex. 4 | 62 | 0.15 | 615 (121) | 1006 | 0.13 | 93 | 160 | 16 | 0.04 | 107 | 93 |
| Ex. 5 | 55 | 0.12 | 645 (127) | 766 | 0.13 | 83 | 150 | 20 | 0.05 | 105 | 85 |
| Ex. 6 | 65 | 0.12 | 650 (128) | 960 | 0.13 | 94 | 200 | 20 | 0.06 | 110 | 87 |
| Ex. 7 | 80 | 0.15 | 655 (129) | 850 | 0.18 | 87 | 129 | 9 | 0.16 | 120 | 86 |
| Cp. Ex. 3 | 62 | 0.15 | 480 (94) | 900 | 0.15 | 80 | 150 | 30 | 0.80 | 85 | 120 |
| Cp. Ex. 4 | 62 | 0.15 | 460 (86) | 550 | 2.80 | 77 | 200 | 35 | 2.00 | 80 | 120 |

FIGS. in the parentheses show a resistance index to puncture (%).
*1: Resistance to puncture by edge
*2: Resistance to puncture by needle
*3: Thickness retention rate
*4: Inner pressure of battery
Cp. Ex.: Comparative Example
Ex: Example

Resistance to Puncture by Edge

Separators were piled to make the total thickness about 2 mm. A stainless steel jig (thickness=0.5 mm; edge angle at its tips 60°) set on a Handy-type Compression Tester (NES-G5; manufactured by Kato Tech Co. Ltd.) was vertically put through the uppermost separator at the rate of 0.01 cm/second and the force required for cutting the said uppermost separator was measured. The results are as shown in Table 1. It is predicted from these results that, in the separator of the present invention, it hardly happens that the plate flash will go through the separator and the separator will be torn off by the plate edge. When the force required for cutting the separator of Comparative Example 1 is set as a standard (100), the ratio of the force required for cutting each separator as compared with the standard is defined as a resistance index to puncture (%). Such ratios are also shown in Table 1.

Resistance to Puncture by Needle

One separator was placed on a support stand having a cylindrical through hole (inner diameter=11 mm) in such a manner as to cover the said cylindrical through hole. Then a fixing material having a cylindrical through hole (inner diameter=11 mm) was further placed on the separator in such a manner as to fit its center with the center of the cylindrical through hole of the above support stand whereby the separator was fixed. Thereafter a needle (curvature radius at its tip: 0.5 mm; diameter=1 mm; projection length from the jig: 2 cm) set on a Handy-type compression Tester (KES-G5; manufactured by Kato Tech Co., Ltd.) was pushed through the separator at the rate of 0.01 cm/second and the force required for puncturing the separator was measured. The results are as shown in Table 1. From the results, it is predicted that, in the separator of the present invention, the plate flash will hardly go through the separator whereby short circuit will hardly take place.

(1) Light was irradiated from a light source to each separator. Among the irradiated light, the light reflected from a predetermined region of the separator was received by a light-receiving element to obtain an luminance information.

(2) The predetermined region of the separator was equally divided into images each having the size of 3 mm square, 6 mm square, 12 mm square or 24 mm square to prepare one pattern. As a result, four diverse division patterns were totally obtained.

(3) A luminance value for each section obtained by the equal division with respect to each resultant division pattern was calculated based upon the luminance information.

(4) An average luminance (X) for each division pattern was calculated based upon the luminance value for each section.

(5) A standard deviation (σ) for each division pattern was determined.

(6) A coefficient of variation (CV) for each division pattern was calculated by the following formula:

$$\text{Coefficient of Variation } (CV) = (\sigma/X) \times 100$$

wherein σ is a standard deviation for each division pattern and X is an average luminance for each division pattern.

(7) A coordinate group was obtained by assigning the logarithm of each image size to the coordinate X and the coefficient of variation corresponding to the said image size to the coordinate Y. The resulting coordinate group was subjected to regression to a primary straight line by means of a least-squares method, whereby its inclination was calculated. The absolute value of the said inclination was defined as a texture index.

The results are as shown in Table 1. It is apparent from the results that the separator of the present invention has an excellent formation. Therefore, it is predicted that the separator will hardly be cut by the plate edge and the-plate flash will hardly go through the separator whereby shot circuiting will hardly take place.

Measurement of Thickness Retention Ratio

Each separator was measured for its thickness by a micrometer (spindle diameter=6.35 mm) in applying the load of 200 g to the separator (normal thickness). Then the thickness of the separator was measured by the micrometer in applying the load of 1,000 g thereto. The percentage of the thickness at the load of 1,000 g to that at the load of 200 g was calculated and was defined as a thickness retention ratio. The results are as shown in Table 1. It is apparent from Table 1 that the separator of the present invention has an ability to retain its thickness. Therefore, it has excellent inner pressure characteristics and it is also capable of preventing the deficiency of the electrolyte. Accordingly it is predicted that batteries having a long life can be manufactured.

Measurement of Tensile Strength in the Longitudinal Direction

Each separator cut in a width of 50 mm was fixed between fasteners (distance between the fasteners 100 mm) in a tensile strength tester (Tensilon UTM-III-100, manufactured by Orientec Co., Ltd.). Under the condition: tensile speed= 300 mm/minute, each separator in the longitudinal direction was measured for its tensile strength. The results are as shown in Table 1.

As shown therein, the separator of the present invention has an excellent tensile strength and, therefore, it is not broken even by the tension during the manufacture of the batteries.

Measurement of Ductility in the Longitudinal Direction

Each separator cut in a width of 50 mm was fixed between fasteners (distance between the fasteners: 100 mm) in a tensile strength tester (Tensilon UTM-III-100, manufactured by Orientec Co., Ltd.). Under the conditions tensile speed= 300 mm/minute, each separator was pulled and was measured for its the elongation upon breakage of the separator in the longitudinal direction. Thereafter, the percentage of the elongation to the distance between the fasteners (100 mm) was calculated and defined as a ductility of the separator. The results are an shown in Table 1. As shown therein, the separator of the present invention has a low ductility whereby batteries can be manufactured with a good workability.

Short Circuit Rate

Plate groups were actually prepared using each separator thus obtained herein. The rate of failing to manufacture a battery due to short circuiting caused by a flash of the plate was defined as a short circuit rate. The results are as shown in Table 1. From the results, it has been found that, in the separator of the present invention, short circuiting does not take place by the plate flash and the batteries can be manufactured in a stable manner.

Battery Life (or Cell Life) Test

As current electrode collectors, a paste type nickel anode (width=33 mm; length=182 mm) using a foamed nickel base and a paste type hydrogen-containing alloy cathode (mesh metal type alloy; width=33 mm; lengths 247 mm) were prepared, respectively.

Then each separator was cut into pieces each having a width of 33 mm and a length of 410 mm. Each separator was interposed between the anode and cathode plates. The resultant layered product was spirally wound to prepare a plate group (having an overlapped, spiral configuration in cross section) corresponding to an SC (sub-c) type. The plate group was placed in an outer packing can into which 5N potassium hydroxide and 1N lithium hydroxide were charged as an electrolyte and then sealed to prepare a cylindrical nickel-hydrogen battery.

Thereafter, a charge-discharge cycle consisting of (1) a 150% charge at 0.2C and (2) a discharge at 1C until the final voltage of 1V was repeated for each cylindrical nickel-hydrogen battery. When the discharge capacity became 50% of the initial capacity, the battery was judged to be exhausted in terms of its life and the cycle numbers until the exhaustion of the battery in terms of its life were measured. When the cycle numbers for the battery using the separator of Comparative Example 1 are set as a standard (100), each ratio of batteries in terms of their cycle numbers as compared with the standard was obtained. The resultant ratios are shown in Table 1. From these results, it has been noted that the batteries using the separator of the present invention exert a long life.

Test for inner Pressure of Batteries

A cylindrical type nickel-hydrogen battery formed in the same manner as that used in the above test for battery life was charged with 0.5C at 20° C. and the inner pressure of the batters at 150% of the capacity was measured. When the inner pressure of the battery using the separator of Comparative Example 1 is set as a standard (100), each ratio of batteries in terms of their inner pressure as compared with the standard was obtained. The ratios are shown in Table 1. From this results, it has been noted that the batteries using the separator of the present invention show low inner pressure.

While the present invention has been described specifically in detail with reference to certain embodiments, examples, etc., it would be apparent that it is possible to practice it in other forms. In light of the disclosure, it will be understood that various modifications and variations are within the spirit and scope of the appended claims. All of the patent publications and reference documents cited herein for illustrative purposes are hereby incorporated by reference into the present disclosure.

What is claimed is:

1. A battery separator which is equipped with a fiber sheet containing polypropylene fibers where their tensile strength is 10 g/d (denier) or more and their Young's modulus is 800 kg/mm$^2$ or more, said separator possessing a resistance to puncture by an edge with 585 gf or more, and having a mass per unit area is 100 g/m$^2$ or less.

2. The separator according to claim 1, wherein the fiber sheet contains not less than 20 mass % of fusible fibers.

3. The separator according to claim 2, wherein the tensile strength of the fusible fiber in 3 g/d (denier) or more.

4. The separator claim 2, wherein the polypropylene fiber is thicker than the fusible fiber.

5. The separator according to claim 2, wherein a low-melting component of the fusible fiber is high-density polyethylene.

6. The separator according to claim 1, wherein the fiber sheet contains not less than 10 mass % of superfine polyolefin fibers with a fineness of 0.5 denier or less.

7. The separator according to claim 1, wherein the fiber sheet contains not less than 20 mass % of superfine polyolefin fibers with a fineness of 0.5 denier or less.

8. The separator according to claim 1, wherein a thermal shrinkage ratio of the polypropylene fiber at 140° C. is 8% or less.

9. The separator according to claim 1, wherein the polypropylene fiber is non-circular in cross section.

10. The separator according to claim 1, wherein the polypropylene fiber can be fibrillated.

11. The separator according to claim 1, wherein its resistance to puncture by needle is 700 gf or more.

12. The separator according to claim 1, wherein its texture index is 0.2 or less.

13. The separator according to claim 1, wherein its thickness retention ratio is 86% or more.

14. A battery separator which is equipped with a fiber sheet containing not less than 10 mass % of polypropylene fibers having a tensile strength of 10 g/d (denier) or more and a Young's modulus of 800 kg/mm$^2$ or more, the separator possessing a mass per unit area of 100 g/m$^2$ or less.

15. The separator according to claim 14, wherein the fiber sheet contains not less than 20 mass % of fusible fibers.

16. The separator according to claim 15, wherein the tensile strength of the fusible fiber is 3 g/d (denier) or more.

17. The separator according to claim 15, wherein the polypropylene fiber is thicker than the fusible fiber.

18. The separator according to claim 15, wherein a low-melting component of the fusible fiber is high-density polyethylene.

19. The separator according to claim 14, wherein the fiber sheet contains not less than 10 mass % of superfine polyolefin fibers with a fineness of 0.5 denier or less.

20. The separator according to claim 14, wherein the fiber sheet contains not less than 20 mass % of superfine polyolefin fibers with a fineness of 0.5 denier or less.

21. The separator according to claim 14, wherein a thermal shrinkage ratio of the polypropylene fiber at 140° C. is 8% or less.

22. The separator according to claim 14, wherein the polypropylene fiber is non-circular in cross section.

23. The separator according to claim 14, wherein the polypropylene fiber can be fibrillated.

24. The separator according to claim 14, wherein its resistance to puncture by needle is 700 gf or more.

25. The separator according to claim 14, wherein its texture index is 0.2 or less.

26. The separator according to claim 14, wherein its thickness retention ratio is 86% or more.

* * * * *